United States Patent [19]
Korn et al.

[11] Patent Number: 5,996,113
[45] Date of Patent: *Nov. 30, 1999

[54] METHOD AND APPARATUS FOR GENERATING DIGITAL CHECKSUM SIGNATURES FOR ALTERATION DETECTION AND VERSION CONFIRMATION

[75] Inventors: Rodney A. Korn, Hillsboro; Anand Pashupathy, Beaverton, both of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/753,389

[22] Filed: Nov. 26, 1996

[51] Int. Cl.⁶ .................................................. G06F 11/00
[52] U.S. Cl. ............................................ 714/807; 714/746
[58] Field of Search ...................... 371/53, 22.4, 37.01, 371/37.4, 37.5, 37.8, 48, 49.1, 49.2; 395/183.18, 183.14, 185.05, 185.02, 185.01; 364/265.2, 944.5; 714/807, 732, 752, 755, 756, 757, 758, 759, 799, 800, 801, 42, 38, 48, 50, 52

[56] References Cited

U.S. PATENT DOCUMENTS

| | | | |
|---|---|---|---|
| 4,345,328 | 8/1982 | White | 371/38 |
| 4,849,978 | 7/1989 | Dishon et al. | 395/182.04 |
| 5,325,372 | 6/1994 | Ish-Shalom | 371/37.6 |
| 5,477,551 | 12/1995 | Parks et al. | 371/37.7 |
| 5,491,700 | 2/1996 | Wright et al. | 371/37.8 |
| 5,663,952 | 9/1997 | Gentry, Jr. | 371/53 |
| 5,691,997 | 11/1997 | Lackey, Jr. | 371/53 |
| 5,721,745 | 2/1998 | Hladik et al. | 371/37.4 |

*Primary Examiner*—Trinh L. Tu
*Attorney, Agent, or Firm*—Blakely, Sokoloff, Taylor & Zafman LLP

[57] ABSTRACT

A method is described for generating a digital checksum signature for a collection of data. According to the method, a first operation is performed on the collection of data to generate a first encoded result. The first encoded result is used to define a first portion of the digital checksum signature. A second operation is performed on the collection of data to generate a second encoded result. The second encoded result is used to define a second portion of the digital checksum signature.

28 Claims, 9 Drawing Sheets

Fig. 6

| CHECKSUM | VERSION |
|----------|---------|
| FFDD0IB0 | 3.1 |
| FF00BBCI | 3.0 |
| F00AAII | 2.5 |
| C0IAAII0 | 2.0 |
| ⋮ | ⋮ |

METHOD AND APPARATUS FOR GENERATING DIGITAL CHECKSUM SIGNATURES FOR ALTERATION DETECTION AND VERSION CONFIRMATION

FIELD OF THE INVENTION

The present invention pertains to the field of the transmission of digital data from a source device to a destination device. More specifically, the present invention relates to an improved digital checksum signature used for alteration detection and version confirmation.

BACKGROUND OF THE INVENTION

In modern data processing and communication systems, it is often desirable to transfer data between separate and often disparate devices. A common problem arises in such systems when a collection of data transferred from a source device is altered in some way before reaching its destination. The alteration may have various possible causes, including environmental noise, defective or noisy communication transmission lines, a defective data channel, or malicious tampering.

To guard against alteration, error checking mechanisms have been used to verify the correctness of bits received at the receiving device. These mechanisms often included the use of checksums. Checksums involved computing a digital signature for blocks of data to be transmitted. As a block of data was sent over the bus, circuitry at the source device computed a quasi-unique string of data called an "expected signature". A similar signature was computed at the receiving device called an "error detection signature". The error detection signature was compared with the expected signature to determine whether the original collection of data had been altered.

In the past, simple checksum codes were used in error checking mechanisms. A system employing the use of a simple checksum code performed an algorithm such as an exclusive-OR operation between each sequential byte within the collection of data. The checksum was defined as the net resultant binary quantity obtained from these repetitive exclusive-OR operations. A system employing the use of a simple checksum code may have also performed an algorithm such as a summing operation between each sequential byte within the collection of data. The checksum was defined as the net resultant binary quantity obtained from the sum of the bytes in the collection of data.

The use of simple checksum codes had the drawback of not providing the adequate security computer systems required for error detection. For example, the simple checksum code performing exclusive-OR operations had inherent pattern sensitivity for short burst errors randomly distributed throughout the collection of data. Thus, use of an exclusive-OR operation between sequential bytes within the collection of data rendered it possible for errors to cancel one another, and therefore not be detected. Similarly, the simple checksum code performing summing operations was easy to break. A malicious party wishing to insert corrupted data into the collection of data could have easily calculated the expected signature and altered the appropriate bits such that the error detection signature would match. This problem existed for digital checksum signatures which were short as well as long.

Thus, an improved method and apparatus for generating digital checksum signatures where the signatures are difficult to break is needed. It is also desirable to be able to use the digital check signatures to identify the version number of the collection of data and when changes have been made to the collection of data.

SUMMARY OF THE INVENTION

According to one embodiment of the invention, a method is described for generating a digital checksum signature for a collection of data. According to the method, a first operation is performed on the collection of data to generate a first encoded result. The first encoded result is used to define a first portion of the digital checksum signature. A second operation is performed on the collection of data to generate a second encoded result. The second encoded result is used to define a second portion of the digital checksum signature.

According to an alternate embodiment of the invention, a method is described for generating a digital checksum signature for a collection of data. According to the invention, a first string of data is defined. The first string is defined by a first plurality of bits represented at a first position on the first string and a second plurality of bits represented at a second position on the first string. A second string of data is defined. The second string of data is defined by zero values represented at a first position of the second string and the second plurality of bits represented at a second position on the second string. The values defined by the first string and the second string are summed.

According to further embodiment of the invention, a method is described for identifying a version of a collection of data. According to the invention, a digital checksum signature of the collection of data is generated. A version identifier is looked-up in a checksum-version table using the digital checksum signature.

BRIEF DESCRIPTION OF THE DRAWINGS

The present invention is illustrated by way of example and not by way of limitation in the figures of the accompanying drawings, in which like references indicate similar elements and in which:

FIG. 6 is diagram illustrating a checksum-version table according to present invention;

DETAILED DESCRIPTION

Figure 1:
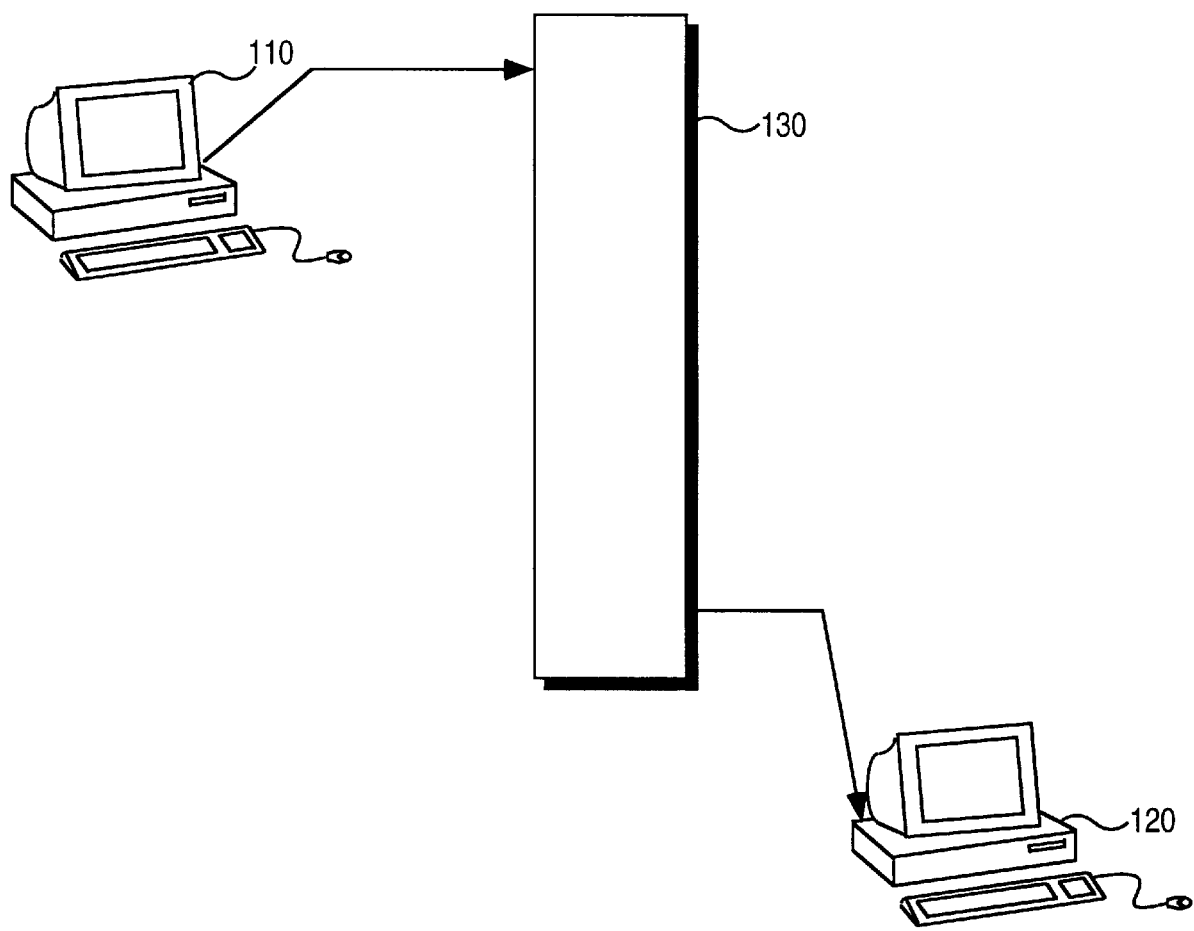
FIG. 1 illustrates the environment in which the present invention is implemented.

FIG. 1 illustrates an environment in which the present invention is implemented. The computer system 110 operates as a source device that sends a collection of data to the computer system 120 that operates as a receiving device. The collection of data may be, for example, a data file. The collection of data is sent via a data transmission medium 130. The data transmission medium 130 may be one of many mediums such as a telephone wire, ethernet cable, ISDN channel, an internet connection, or other transmission medium.

Figure 2:
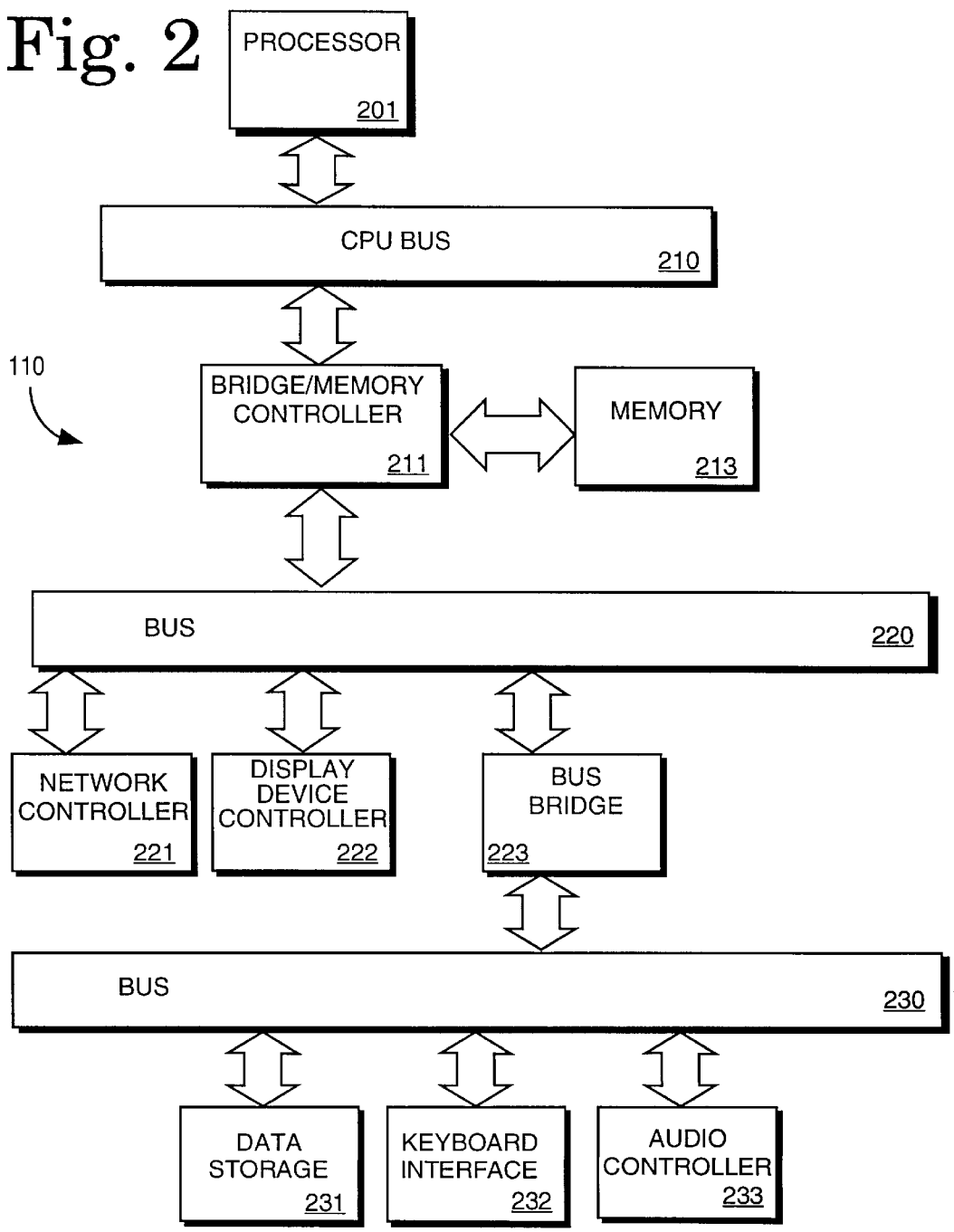
FIG. 2 illustrates a block diagram of a computer system implementing one embodiment of the present invention.

Referring to FIG. 2, a computer system upon which an embodiment of the present invention can be implemented is shown as 110. The computer system 110 comprises a processor 201 that processes digital data. The processor 201 can be a complex instruction set computing (CISC) microprocessor, a reduced instruction set computing (RISC) microprocessor, a very long instruction word (VLIW) microprocessor, a processor implementing a combination of instruction sets, or other processor device. The processor 201 is coupled to a CPU bus 210 which transmits signals between the processor 201 and other components in the computer system 110.

A memory 213 comprises a dynamic random access memory (DRAM) device, a static random access memory (SRAM) device, or other memory devices. The memory 213 stores information or other intermediate data during execution by the processor 201. A bridge memory controller 211 is coupled to the CPU bus 210 and the memory 213. The bridge memory controller 211 directs data traffic between the processor 201, the memory 213, and other components in the computer system 110 and bridges signals from these components to a high speed I/O bus 220.

The high speed I/O bus 220 supports peripherals operating at high data throughput rates. The bus 220 can be a single bus or a combination of multiple buses. As an example, the bus 220 can comprise a Peripheral Components Interconnect (PCI) bus, a Personal Computer Memory Card International Association (PCMCIA) bus, or other buses. The bus 220 provides communication links between components in the computer system 110. A network controller 221 links a network of computers together and provides communication among the machines. A display device controller 222 is coupled to the high speed I/O bus 220. The display device controller 222 allows coupling of a display device to the computer system and acts as an interface between the display device and the computer system 110. The display device receives information and data from the processor 201 through the display device controller 222 and displays the information and data to the user of the computer system 110.

A bus bridge 223 couples the high speed I/O bus 220 to I/O bus 230. The bus bridge 223 comprises a translator to bridge signals between the high speed I/O bus 220 and the I/O bus 230.

The I/O bus 230 is used for communicating information between peripheral device which operate at lower throughput rates. The I/O bus 230 can be a single bus or a combination of multiple buses. As an example, the bus 230 can comprise an Industry Standard Architecture (ISA) bus, an Extended Industry Standard Architecture (EISA) bus or a Micro Channel Architecture (MCA) bus. The bus 230 provides communication links between components in the computer system 110. A keyboard interface 232 can be a keyboard controller or other keyboard interface. The keyboard interface 232 can be a dedicated device or can reside in another device such as a bus controller or other controller. The keyboard interface 232 allows coupling of a keyboard to the computer system and transmits signals from a keyboard to the computer system 110. A data storage device 231 can be a hard disk drive, a floppy disk drive, a CD-ROM device, a flash memory device or other mass storage device. An audio controller 233 operates to coordinate the recording and playing of sounds is also coupled to I/O bus 130.

The present invention is related to the use of the computer system 110 to generate digital checksum signatures for alteration detection and version confirmation. According to one embodiment, generating digital checksum signatures is performed by computer system 110 in response to the processor 201 executing sequences of instructions contained in the memory 213. Such instructions may be read into the memory 213 from other computer-readable mediums such as data storage device 231. Execution of the sequences of instructions contained in the memory 213 causes the processor to generate digital checksum signatures, as will be described hereafter. In alternative embodiments, hard-wired circuitry may be used in place of or in combination with software instructions to implement the present invention. Thus, the present invention is not limited to any specific combination of hardware circuitry and software.

Figure 3:
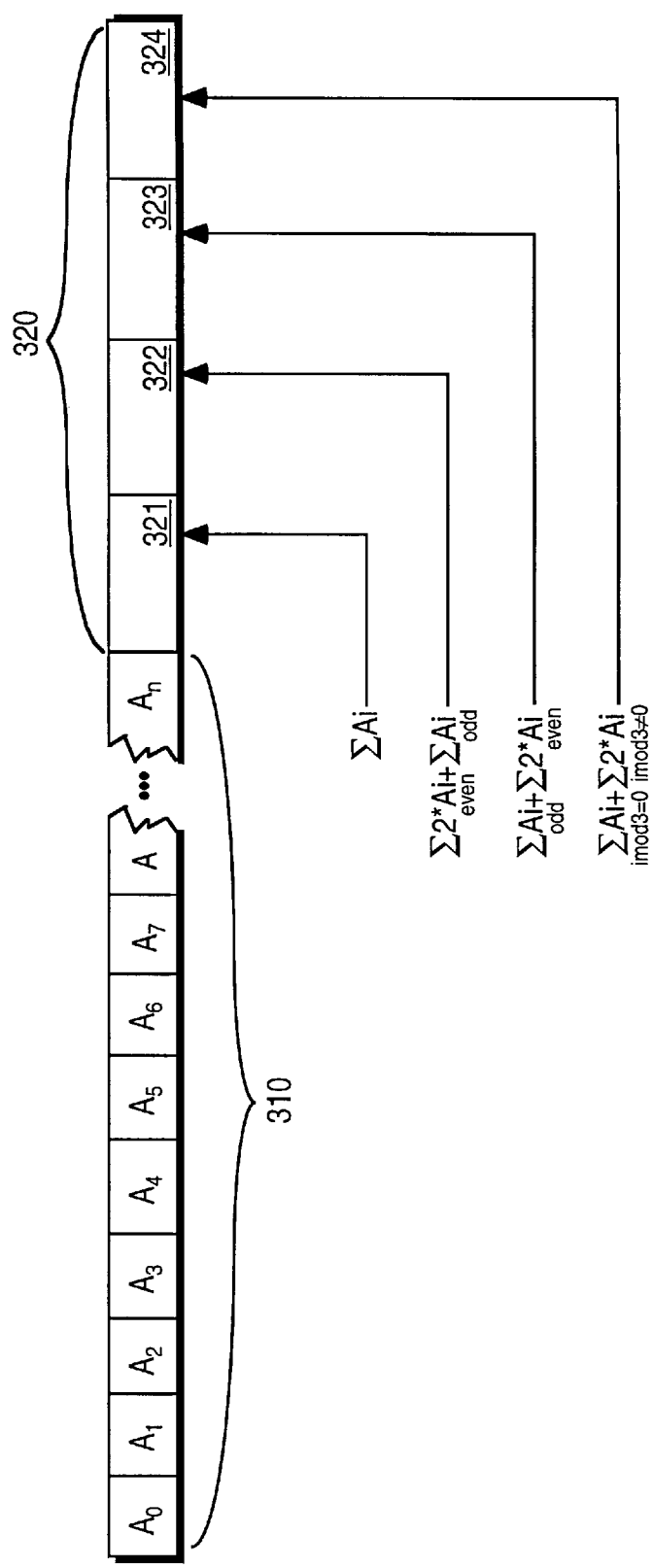
FIG. 3 illustrates the structure of a digital checksum signature according to one embodiment of the present invention.

FIG. 3 illustrates one embodiment of the structure of a digital checksum signature generated by the present invention. Bytes $A_0$ through $A_n$ represent the bytes of data in a collection of data 310. Bytes 320 represent the digital checksum signature of the collection of data 310. Digital checksum signature 320 includes a plurality of bytes 321–324 that define the digital checksum signature 320. Each of the bytes 321–324 contains a result of a different arithmetic algorithm or checksum operation performed on the collection of data 310.

Byte 321 contains the lower 8 bits of the result obtained from a first checksum operation summing the bytes of the collection of data 310. Byte 322 contains the lower 8 bits of the result obtained from a second checksum operation summing the odd bytes of the collection of data 310 multiplied by 2 and the even bytes of the collection of data 310. Byte 323 contains the lower 8 bits of the result obtained from a third checksum operation summing the odd bytes of the collection of data 310 and the even bytes of the collection of data 310 multiplied by 2. Byte 324 contains the lower 8 bits of the result obtained from a fourth checksum operation summing every third byte of the collection of data 310 and the other bytes of the collection of data 310 multiplied by 2.

The digital checksum signature 320 of the present invention is an improvement over prior art checksum methods which were susceptible to error cancellation and malicious tampering. Each of the bytes 321–324 in the digital checksum signature 320 is the product of an unique checksum operation and is thus independent from one another. Thus, an alteration to any one of the bits in collection of data 310 alters each of the bytes 321–324 uniquely. This prevents the likelihood of having one error in one byte of the collection of data 310 canceling a second error in a second byte of the collection of data 310. In addition, the added complexity of implementing multiple checksum operations in a single digital checksum signature such that each of the bytes in the signature are affected uniquely reduces the likelihood that a malicious party would be able to break the checksum signature.

It should be appreciated that the present invention may be implemented with any number of bytes for storing the digital checksum signature. A larger number of bytes may be used to allow more than 4 different checksum operations to be implemented in the digital checksum signature and a smaller number of bytes may be used for an implementation of smaller scale. It should also be appreciated that any number of bits may be used for storing the results of a particular checksum operation depending on the desired precision of the result. Furthermore, any arithmetic algorithm or checksum operation may be used to generate a specific result to be stored in the digital checksum signature 320. The present invention is not intended to be limited to the examples illustrated in FIG. 3.

Figure 4:
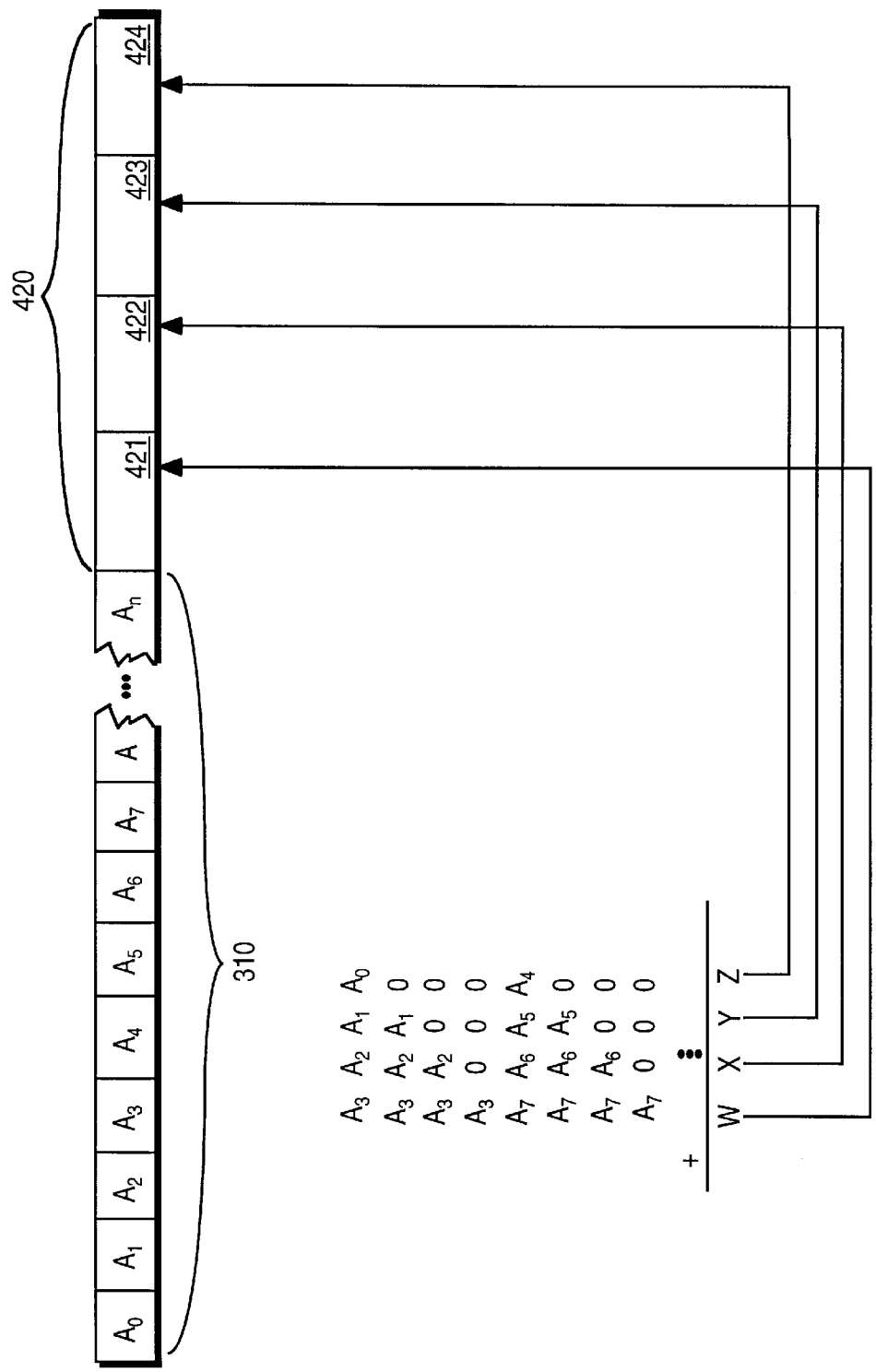
FIG. 4 illustrates the structure of a digital checksum signature according to an alternate embodiment of the present invention.

FIG. 4 illustrates an alternate embodiment of the structure of a digital checksum signature generated by the present invention. Bytes $A_0$ through $A_n$ represent the bytes of data in a collection of data 310. Bytes 420 represent the digital checksum signature of the collection of data 310. Digital checksum signature 420 includes a plurality of bytes 421–424 that define the digital checksum signature 420. In this embodiment of the digital checksum signature 420, bytes 421–424 contain the lower bits of a result obtained from performing a plurality of checksum operations on the collection of data 310.

The first checksum operation takes a first four bytes of data from the collection of data 310 and designates the first byte, $A_0$, in a first position, the second byte, $A_1$, in a second position, the third byte, $A_3$, in a third position, and the fourth byte, $A_4$, in a fourth position, where the first position represents the least significant byte and the fourth position represents the most significant byte. The first checksum operation takes the first four bytes of data in their designated positions and adds the bytes with a second string of data consisting of a byte of zeros in the first position, the second byte, $A_1$, in the second position, the third byte, $A_2$, in the third position, and the fourth byte, $A_3$, in the fourth position.

The second checksum operation takes the result of the first checksum operation and adds the result to a third string of data consisting of a byte of zero in the first position, a byte of zero in the second position, the third byte, $A_2$, in the third position, and the fourth byte, $A_3$, in the fourth position.

The third checksum operation takes the result of the second checksum operation and adds the result to a fourth string of data consisting of a byte of zeros in the first position, a byte of zero in the second position, a byte of zeros in the third position, and the fourth byte, $A_3$, in the fourth position.

The fourth checksum operation takes a second four bytes of data from the collection of data 310 and designates the fifth byte, $A_4$, in the first position, the sixth byte, $A_5$, in the second position, the seventh byte, $A_6$, in the third position, and the eighth byte, $A_7$, in the fourth position. The fourth checksum operation takes the second four bytes of data in their designated positions and adds it with the result of the third checksum operation.

The fifth checksum operation takes the result of the fourth checksum operation and adds the result to a sixth string of data consisting of a byte of zeros in the first position, the sixth byte, $A_5$, in the second position, the seventh byte, $A_6$, in the third position, and the eighth byte, $A_7$, in the fourth position.

The sixth checksum operation takes the result of the fifth checksum operation and adds the result to a seventh string of data consisting of a byte of zero in the first position, a byte of zero in the second position, the seventh byte, $A_6$, in the third position, and the eighth byte, $A_7$, in the fourth position.

The seventh checksum operation takes the result of the sixth checksum operation and adds the result to a eighth string of data consisting of a byte of zeros in the first position, a byte of zero in the second position, a byte of zeros in the third position, and the eighth byte, $A_7$, in the fourth position. If the collection of data contains another four bytes of data, the computer system would perform checksum operations similar to those performed on the first and second four bytes of data. The lower bits of the results are stored in bytes 421–424.

This embodiment of the present invention allows multiple checksum operations to define a digital checksum signature where each bit of the digital checksum signature is dependent on a previous bit for carry-overs.

It should be appreciated that the present invention may be implemented with any number of bytes for storing the digital checksum signature. A larger number of bytes may be used to allow the more significant bits of the result to be represented. Furthermore, any series of arithmetic algorithms or checksum operations may be used to generate the result stored in the digital checksum signature 420. The present invention is not intended to be limited to the examples illustrated in FIG. 4.

Figure 5:
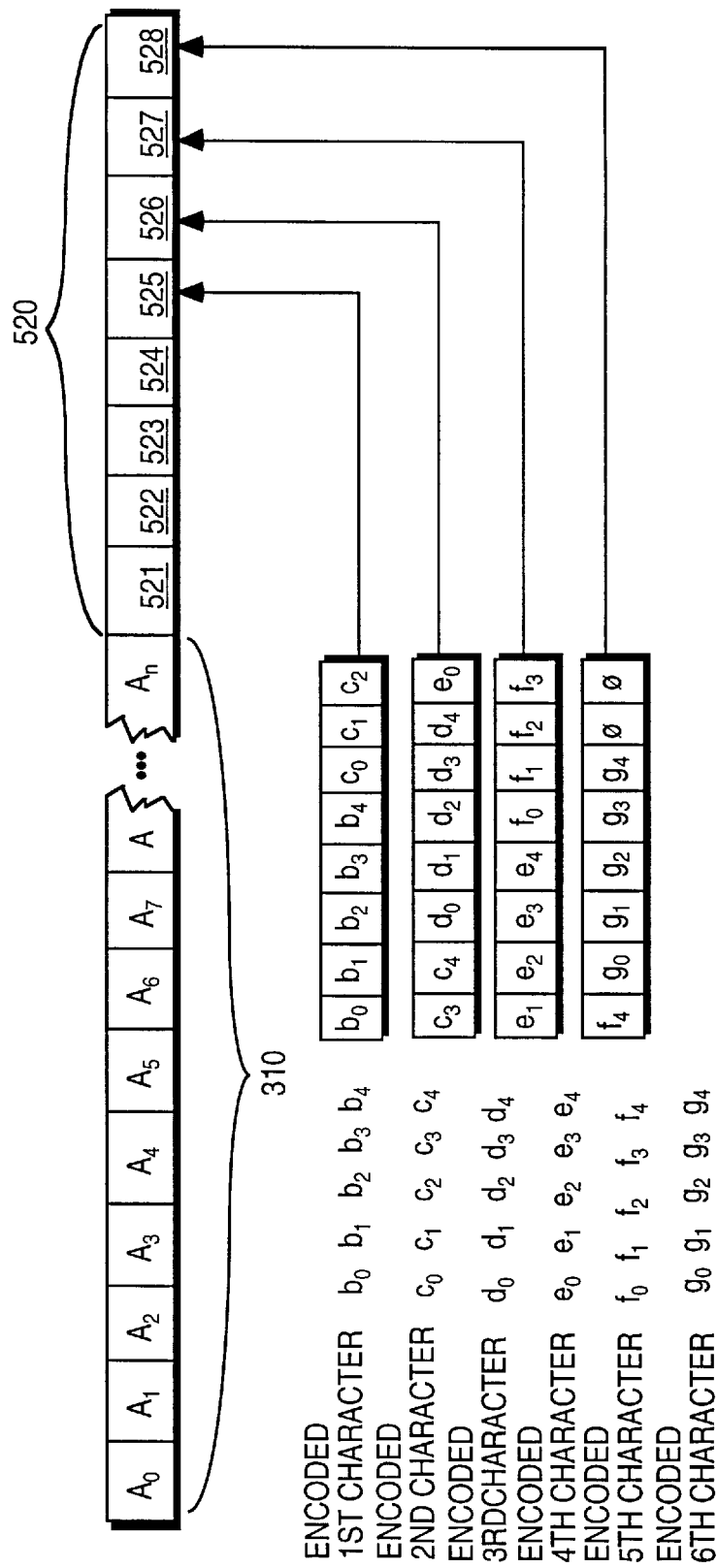
FIG. 5 illustrates the structure of a digital checksum signature according to a further embodiment of the present invention.

FIG. 5 illustrates a further embodiment of the structure of a digital checksum signature. Bytes $A_0$ through $A_n$ represent the bytes of data in a collection of data 310. Bytes 520 represent the digital checksum signature of the collection of data 310. Digital checksum signature 520 includes a plurality of bytes 521–528 that define the digital checksum signature 520. In this embodiment of the digital checksum signature 520, bytes 521–524 contain the lower bits of the result of a single checksum operation or results of a plurality of checksum operations. Bytes 521–524 may, for example, contain the lower bits of the result of the plurality of checksum operations described and shown in FIG. 3 or the result of the checksum operation described and shown in FIG. 4, or other checksum operations.

Bytes 525–528 are allocated for storing a string of data. In one embodiment of the present invention, bytes 525–528 are use for storing the first six characters of a string of data. The six characters may be an alphabetic character from A–Z or a numerical character from 0–4. Each of the characters are encoded into binary form and are represented by 5 bits. The bits representing the six characters are written into the 5 bytes 525–528 by "wrapping" the bits in the manner shown in FIG. 5. The encoded characters of data may represent a file name or a company name which may be used to identify the collection of data.

It should be appreciated that the present invention may be implemented with any number of bytes for storing either the results of the checksum operation or the encoded string of data. A larger number of bytes may be used to allow a larger number of characters to be stored or allow a larger numeric representation to be available. The encoded string of data provides a label to identify the checksum signature 520.

The present invention allows the use of the digital checksum signature for a collection of data to determine the version number of the collection of data. Referring back to FIG. 1, after computer system 110 generates an expected signature for the collection of data to be sent to computer system 120, computer system 110 updates a checksum-version table for that collection of data. The checksum-version table lists the current digital checksum signature calculated for the collection of data and an assigned version number to the collection of data. The checksum-version table also contains previous checksum values calculated for the collection of data and corresponding version identifiers assigned to those checksums. FIG. 6 illustrates one embodiment of the checksum-version table. The checksum-version table is a n×2 table having a first column listing checksum values and a second column listing version identifiers. In another embodiment of the present invention, the time the checksum-version table is updated is listed next to the version identifier to provide identification as to when changes have occurred in the collection of data.

Referring back to FIG. 1, after computer system 110 updates the checksum-version table for the collection of data, the computer system 110 sends the checksum-version table to the computer system 120 via transmission medium 130. The checksum-version table allows the computer system 120 to use the error detection signature that it calculates to identify the version identifier of the collection of data it has received.

The present invention provides a method for version confirmation or version stamping that is an improvement over prior art methods. This versioning method allows other software to identify the version of the collection of data and will make it possible to identify when changes have occurred in the file. The present invention allows file version information to be provided without encoding the information into the collection of data. and allows several users of the same collection of data to use their own version numbering scheme without altering the contents of the collection of data.

In the past, a user of a file had the option of stamping a version number in the file data only if the user had control of the program's executables. The format of the version stamp was determined by the creator of the file or program. The present invention allows the user to create the checksum and to specify his or her own format regardless of how the creator specified the version stamp format.

Figure 7:
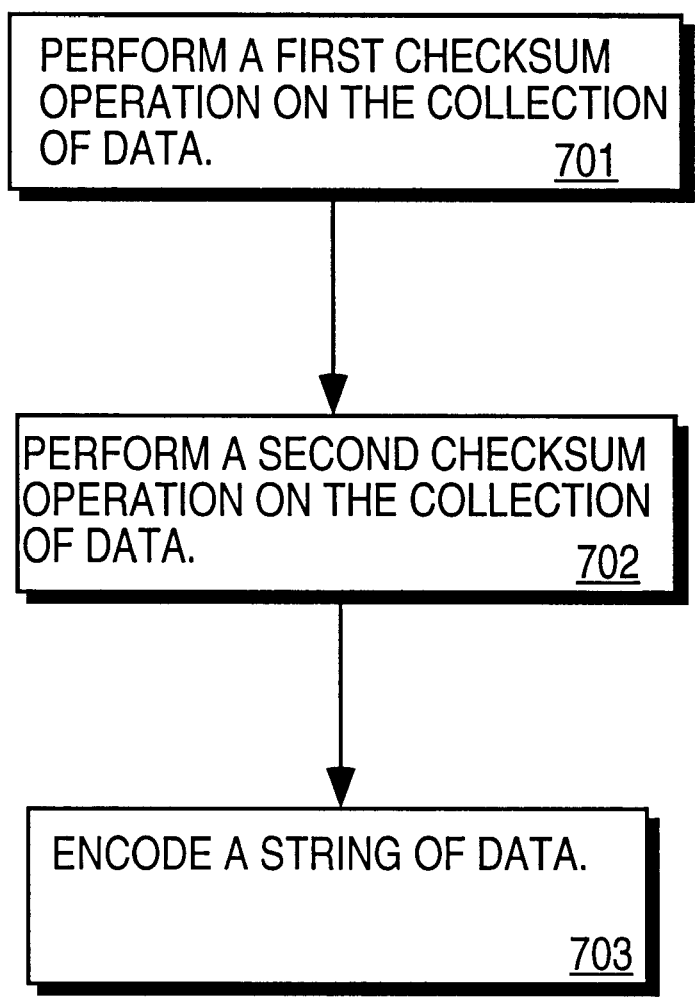
FIG. 7 is a flow chart illustrating a method for generating a digital checksum signature according to one embodiment of the present invention.

FIG. 7 is a flow chart illustrating a method for generating a digital checksum signature. At step 701, a first checksum operation is performed on the collection of data. The first checksum operation may be any known arithmetic algorithm, such as summing all the bytes of the collection of data or multiplying odd bytes of the collection of data by a first number and multiplying even bytes of the collection of data by a second number and summing the results. The result generated from performing the first checksum operation is used to define a first portion of the digital checksum signature. The first portion may be a predetermined number of bits or bytes of any length. In the case where, the size of the first portion of the digital checksum signature is less than the result, only the lower bits of the result are stored in the first portion.

At step 702, a second checksum operation is performed on the collection of data. The second checksum operation may also be any known arithmetic algorithm. The result generated from performing the second checksum operation is used to define a second portion of the checksum signature. The second portion may also be a predetermined number of bits or bytes of any length.

At step 703, a string of data is encoded and is used to define a third portion of the checksum signature. The string of data may be of any size and may be encoded by any known method.

In one embodiment of the present invention, the first, second, and third portions are bytes in the digital checksum signature and the results of the first and second checksum operations and the encoded data are concatenated in order to define the digital checksum signature.

Figure 8:
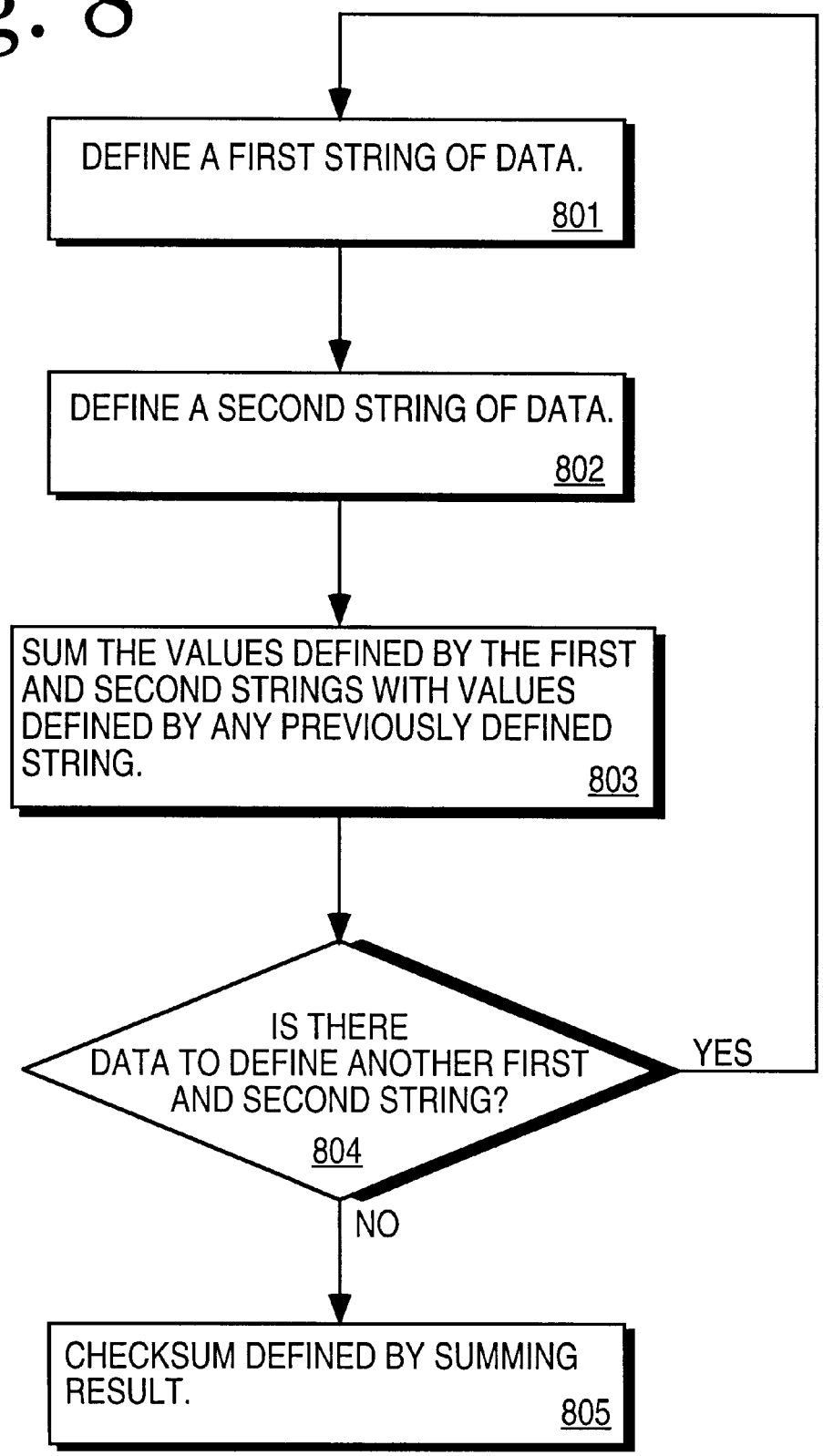
FIG. 8 is a flow chart illustrating a method for generating a digital checksum signature according to an alternate embodiment of the present invention.

FIG. 8 is a flow chart illustrating a method for generating a digital checksum signature according to an alternate embodiment of the present invention. At step 801, a first string of data is defined by a first plurality of bits and a second plurality of bits which have not been previously used to define a string of data for generating the digital checksum signature. The first plurality of bits are represented at a first position of the first string and the second plurality of bits are represented at a second position of the first string, wherein the first position represents the least significant bits and the second position represents the most significant bits.

At step 802, a second string of data is defined by zero values represented at a first position of the second string and the second plurality of bits represented at a second position of the second string.

At step 803, the values defined by the first string and the second string are summed with the values defined by any previously defined strings of data.

At step 804, it is determined whether there is additional data to define another first and second string of data. If there is additional data to define another first and second string of data, control proceeds to step 801. If there is not additional data to define another first and second string of data, control proceeds to step 805.

At step 805, control defines the digital checksum signature as the result of step 803.

Figure 9:
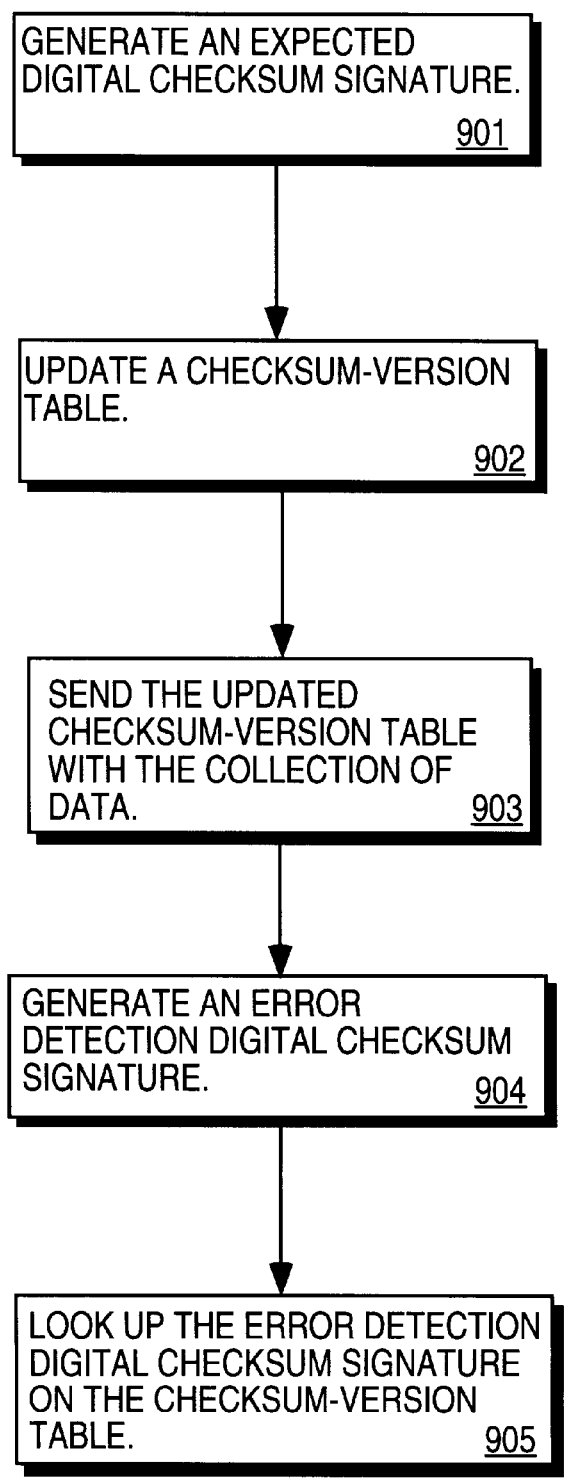
FIG. 9 is a flow chart illustrating a method for version marking and version confirmation according to one embodiment of the present invention.

FIG. 9 is a flow chart illustrating a method for version marking and confirmation according to one embodiment of the present invention. At step 901, an expected digital checksum signature is generated for a collection of data that is to be sent to receiving computer system. The expected digital checksum may be generated by any known method including the method described in FIG. 7.

At step 902, the expected digital checksum is written onto a checksum-version table with an assigned version identifier. The checksum-version table is a table listing current and previous checksum values and corresponding version identifiers. FIG. 6 illustrates one embodiment of a checksum-version table according to the present invention.

At step 903, the updated checksum-version table is sent with the collection of data to the receiving computer system.

At step 904, a error detection digital checksum signature is generated for the collection of data received by the receiving computer system. The error detection digital checksum signature is generated by using the same checksum method used in generating the expected digital checksum signature.

At step 905, the version identifier of the collection of data received by the receiving computer system is identified by looking up the error detection digital checksum signature on the received updated checksum-version table.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than an restrictive sense.

What is claimed is:

1. A method for generating a digital checksum signature for a collection of data, comprising:

performing a first operation on the collection of data to generate a first encoded result defining a first portion of the digital checksum signature; and performing a second operation on the collection of data to generate a second encode result defining a second portion of the digital checksum signatures;

wherein the first and second operations are different operations with at least one of the first and second operations including at least a multiplication operation performed on the collection of data in a positional dependent manner using a plurality of predetermined values.

2. The method of claim 1, further comprising the step of encoding a string of data defining a third portion of the digital checksum signature.

3. The method of claim 1, wherein the step of performing the first operation on the collection of data comprises the steps of:
   summing all bytes in the collection of data; and
   defining the first encoded result with a predetermined number of lower bits of the sum.

4. The method of claim 2, wherein the step of encoding the string of data comprises the step of translating a first predetermined number of characters in the string of data into a second predetermined number of binary values.

5. The method of claim 1, wherein the step of performing the second operation on the collection of data comprises the steps of:
   multiplying odd bytes in the collection of data by a first predetermined value to generate new values for the odd bytes;
   multiplying even bytes in the collection of data by a second predetermined value to generate new values for the even bytes;
   summing the new values for the odd bytes and the new values for the even bytes; and
   defining the second encoded result with a predetermined number of lower bits of the sum.

6. The method of claim 1, further comprising the steps of:
   performing a third operation on the collection of data to generate a third encoded result to define a third portion of the digital checksum signature; and
   performing a fourth operation on the collection of data to generate a fourth encoded result to define a fourth portion of the digital checksum signature.

7. A method for generating a digital checksum signature for a collection of data, comprising:
   defining a first string of data, wherein a first plurality of bits are represented at a first position on the first string and a second plurality of bits are represented at a second position on the first string;
   defining a second string of data, wherein zero values are represented at a first position of the second string and the second plurality of bits are represented at a second position on the second string; and
   summing values defined by the first string and the second string.

8. The method of claim 7, further comprising the steps of:
   determining whether there is additional data to define a third and a fourth string of data;
   defining a third string of data, wherein a third plurality of bits are represented at a first position of the third string and a fourth plurality of bits are represented at a second position of the third string;
   defining a fourth string of data, wherein zero values are represented at the first position of the fourth string and the fourth plurality of bits are represented at a second position of the fourth string; and
   summing values defined by the first, second, third, and fourth string of data.

9. The method of claim 7, further comprising the step of encoding a string of data defining an additional portion of the digital checksum signature.

10. A computer-readable medium having stored thereon sequences of instructions, the sequences of instructions including instructions which, when executed by a processor, causes the processor to perform the steps of:
    performing a first operation on a collection of data to generate a first encoded result to define a first portion of a digital checksum signature; and
    performing a second operation on the collection of data to generate a second encoded result to define a second portion of the digital checksum signature;
    wherein the first and second operations are different operations with at least one of the first and second operations including at least a multiplication operation performed on the collection of data in a positional dependent manner using a plurality of predetermined values.

11. The computer-readable medium of claim 10, further comprising instructions which, when executed by the processor, causes the processor to perform the step of encoding a string of data to define a third portion of the digital checksum signature.

12. The computer-readable medium of claim 11, wherein the step of encoding the string of data comprises the step of translating a first predetermined number of characters in the string of data into a second predetermined number of binary values.

13. The computer-readable medium of claim 14, wherein the step of performing the first operation on the collection of data comprises the steps of:
    summing all bytes in the collection of data; and
    defining the first encoded result with a predetermined number of lower bits of the sum.

14. The computer-readable medium of claim 10, wherein the step of performing the second operation on the collection of data comprises the steps of:
    multiplying odd bytes in the collection of data by a first predetermined value to generate new values for the odd bytes;
    multiplying even bytes in the collection of data by a second predetermined value to generate new values for the even bytes;
    summing the new values for the odd bytes and the new values for the even bytes; and
    defining the second encoded result with a predetermined number of lower bits of the sum.

15. The computer-readable medium of claim 10, further comprising instructions which, when executed by the processor, performs the steps of:
    performing a third operation on the collection of data to generate a third encoded result to define a third portion of the digital checksum signature; and
    performing a fourth operation on the collection of data to generate a fourth encoded result to define a fourth portion of the digital checksum signature.

16. A method for generating a digital checksum signature for a collection of data, comprising:
    performing a first operation on the collection of data to generate a first encoded result defining a first portion of the digital checksum signature; and
    performing a second operation on the collection of data to generate a second encoded result defining a second portion of the digital checksum signature, wherein the step of performing the second operation on the collection of data includes multiplying odd bytes in the collection of data by a first predetermined value to generate new values for the odd bytes, multiplying even bytes in the collection of data by a second predetermined value to generate new values for the even bytes, summing the new values for the odd bytes and the new values for the even bytes, and defining the second encoded result with a predetermined number of lower bits of the sum.

17. The method of claim 16, further comprising the step of encoding a string of data defining a third portion of the digital checksum signature.

18. The method of claim 17, wherein the step of encoding the string of data comprises the step of translating a first predetermined number of characters in the string of data into a second predetermined number of binary values.

19. The method of claim 16, wherein the step of performing the first operation on the collection of data comprises the steps of:
   summing all bytes in the collection of data; and
   defining the first encoded result with a predetermined number of lower bits of the sum.

20. The method of claim 16, further comprising the steps of:
   performing a third operation on the collection of data to generate a third encoded result to define a third portion of the digital checksum signature; and
   performing a fourth operation on the collection of data to generate a fourth encoded result to define a fourth portion of the digital checksum signature.

21. A computer-readable medium having stored thereon sequences of instructions, the sequences of instructions including instructions which, when executed by a processor, causes the processor to perform the steps of:
   performing a first operation on the collection of data to generate a first encoded result defining a first portion of the digital checksum signature; and
   performing a second operation on the collection of data to generate a second encoded result defining a second portion of the digital checksum signature, wherein the step of performing the second operation on the collection of data includes multiplying odd bytes in the collection of data by a first predetermined value to generate new values for the odd bytes, multiplying even bytes in the collection of data by a second predetermined value to generate new values for the even bytes, summing the new values for the odd bytes and the new values for the even bytes, and defining the second encoded result with a predetermined number of lower bits of the sum.

22. The computer-readable medium of claim 21, further comprising instructions which, when executed by the processor, causes the processor to perform the step of encoding a string of data defining a third portion of the digital checksum signature.

23. The computer-readable medium of claim 22, wherein the step of encoding the string of data comprises the step of translating a first predetermined number of characters in the string of data into a second predetermined number of binary values.

24. The computer-readable medium of claim 21, wherein the step of performing the first operation on the collection of data comprises the steps of:
   summing all bytes in the collection of data; and
   defining the first encoded result with a predetermined number of lower bits of the sum.

25. The computer-readable medium of claim 21, further comprising instructions which, when executed by the processor, causes the processor to perform the step of:
   performing a third operation on the collection of data to generate a third encoded result to define a third portion of the digital checksum signature; and
   performing a fourth operation on the collection of data to generate a fourth encoded result to define a fourth portion of the digital checksum signature.

26. A computer-readable medium having stored thereon sequence of instructions, the sequences of instructions including instructions which, when executed by a processor, causes the processor to perform the steps of:
   defining a first string of data, wherein a first plurality of bits are represented at a first position on the first string and a second plurality of bits are represented at a second position on the first string;
   defining a second string of data, wherein zero values are represented at a first position of the second string and the second plurality of bits are represented at a second position on the second string; and
   summing values defined by the first string and the second string.

27. The computer-readable medium of claim 26, further comprising instructions which, when executed by the processor, causes the processor to perform the steps of:
   determining whether there is additional data to define a third and a fourth string of data;
   defining a third string of data, wherein a third plurality of bits are represented at a first position of the third string and a fourth plurality of bits are represented at a second position of the third string;
   defining a fourth string of data, wherein zero values are represented at the first position of the fourth string and the fourth plurality of bits are represented at a second position of the fourth string; and
   summing values defined by the first, second, third, and fourth string of data.

28. The computer-readable medium of claim 26, further comprising instructions which, when executed by the processor, causes the processor to perform the step of encoding a string of data defining an additional portion of the digital checksum signature.

* * * * *

UNITED STATES PATENT AND TRADEMARK OFFICE
CERTIFICATE OF CORRECTION

PATENT NO. : 5,996,113
DATED : November 30, 1999
INVENTOR(S) : Korn et al.

It is certified that error appears in the above-identified patent and that said Letters Patent is hereby corrected as shown below:

Column 1,
Line 15, delete "modem", insert -- modern --.

Signed and Sealed this

Twelfth Day of August, 2003

JAMES E. ROGAN
*Director of the United States Patent and Trademark Office*